US009217607B2

(12) United States Patent
Eschment et al.

(10) Patent No.: US 9,217,607 B2
(45) Date of Patent: Dec. 22, 2015

(54) PLANAR COIL, HEATING DEVICE AND METHOD OF HEATING

(75) Inventors: Holger Eschment, Ahrensburg (DE); Rudiger Stark, Hamburg (DE)

(73) Assignee: SEAL ANALYTICAL GMBH, Norderstedt (DE)

( * ) Notice: Subject to any disclaimer, the term of this patent is extended or adjusted under 35 U.S.C. 154(b) by 33 days.

(21) Appl. No.: 14/004,322

(22) PCT Filed: Mar. 6, 2012

(86) PCT No.: PCT/EP2012/053776

§ 371 (c)(1), (2), (4) Date: Sep. 10, 2013

(87) PCT Pub. No.: WO2012/123278

PCT Pub. Date: Sep. 20, 2012

(65) Prior Publication Data

US 2013/0340538 A1 Dec. 26, 2013

(30) Foreign Application Priority Data

Mar. 11, 2011 (EP) .................................... 11157967

(51) Int. Cl.

| | |
|---|---|
| ***G01N 1/22*** | (2006.01) |
| ***F28F 1/00*** | (2006.01) |
| ***F24H 1/16*** | (2006.01) |
| ***H05B 3/26*** | (2006.01) |

(52) U.S. Cl.

CPC *F28F 1/00* (2013.01); *F24H 1/162* (2013.01); *H05B 3/26* (2013.01)

(58) Field of Classification Search

None

See application file for complete search history.

(56) References Cited

U.S. PATENT DOCUMENTS

| | | | | |
|---|---|---|---|---|
| 2,116,896 | A | 5/1938 | Hudson | |
| 3,297,863 | A * | 1/1967 | Robbiano | 362/549 |
| 3,764,844 | A * | 10/1973 | Schmidt | 313/110 |
| 3,784,310 | A * | 1/1974 | Barton et al. | 356/410 |
| 4,495,040 | A * | 1/1985 | Panico | 204/155 |
| 5,336,467 | A * | 8/1994 | Heidt et al. | 422/64 |
| 7,030,989 | B2 * | 4/2006 | Yager et al. | 356/445 |
| 8,226,605 | B2 | 7/2012 | Faries, Jr. et al. | |
| 8,493,441 | B2 * | 7/2013 | Thonhauser | 348/135 |
| 2009/0134771 | A1 * | 5/2009 | Itaya et al. | 313/493 |

FOREIGN PATENT DOCUMENTS

| | | |
|---|---|---|
| DE | 202008003357 U1 | 7/2008 |
| EP | 2098799 | 9/2009 |
| GB | 2452981 | 3/2009 |
| WO | 02/27246 | 4/2002 |
| WO | 03/007860 | 1/2003 |

OTHER PUBLICATIONS

International Preliminary Report on Patentability, mailed Sep. 26, 2013, for International Patent Application No. PCT/EP2012/053776, 8 pages.

* cited by examiner

*Primary Examiner* — Robert R Raevis

(74) *Attorney, Agent, or Firm* — Casimir Jones, S.C.; Mary Ann Brow

(57) ABSTRACT

The invention provides a planar coil (1) of a tube (2), wherein the planar coil (1) has an overall planar shape. The cross-section of the tube (2) can be oval. The invention further provides a heating device comprising one or more of the planar coil (1). The invention further provides a method for heating a sample comprising the step of heating the sample in the heating device of the invention.

29 Claims, 8 Drawing Sheets

PLANAR COIL, HEATING DEVICE AND METHOD OF HEATING

This application is a §371 US National Entry of International Application No. PCT/EP2012/053776, filed Mar. 6, 2012, which is incorporated herein by reference in its entirety, and which claims the benefit of European Application No. 11157967.8, filed Mar. 11, 2011.

The invention relates to a planar coil that can be used as a component of a heating device. The invention further relates to a heating device comprising such a planar coil and to a method of heating a sample with the heating device comprising the planar coil of the invention. In preferred embodiments, the planar coil can be a glass coil, preferably a borosilicate glass coil.

Devices for analyzing samples often require heating a sample, e.g. a fluid. In addition, such analytical devices can require the distillation of samples, such as fluids.

One example of a device for heating a fluid is disclosed in WO 2009/129777 A2, which discloses a water bath for heating an object placed inside the water of the waterbath. The device comprises a hotplate for heating the water comprising the object.

A further example of a device for heating a fluid is disclosed in WO 2009/108501 A2, which relates to a reaction vessel for heating and mixing a fluid. The fluid is heated inside a reaction vessel by means of dual-action split electromagnetic coil, wherein the coil comprises a metal wire. Said electromagnetic coil has the spatial shape of a coil spring. Such devices for heating a fluid have the disadvantage that they either require a lot of space or that they can only provide inefficient heating.

The invention differs from this state of the art in that a planar coil is provided that has an overall planar shape. Said shape is planar and flat, when referring to the side-view.

The invention can further differ from this state of the art in that the coil comprises a tube that can have an oval cross-section. The outer contour of said tube can have an oval shape, wherein the more extended, longitudinal side faces the underlying surface.

One technical effect mediated by the different technical feature of the overall planar shape of the coil is a lower spatial requirement of the coil, because the flat, planar, even shape of the coil does not require much space. The shape of the coil according to the invention is particularly useful when e.g. fitting one or more of said coils into a heating bath and/or an analytical device. The coil according to the invention as a whole is quite flat and thin and, therefore, is much easier to fit into larger devices, such as a continuous flow analyzer, as compared to standard heating coils known in the art that require much more space, because they are e.g. wound around a heating core or rod, or because they are immersed in a large volume of oil. In addition, the loss of heating energy is much bigger with such conventional heating coils that are wound around a heating core or rod or that are immersed in a large volume of oil, wherein the heated oil can also be potentially dangerous for the operator.

A further technical effect mediated by the oval cross-section of the planar coil is an enhanced thermal conduction due to the larger contact surface of the tube having an oval cross-section to the underlying surface, such as a heating foil or a heating plate. This enhanced thermal conductivity and enhanced thermal energy coupling of the planar coil of the invention enables a particularly good energy efficiency, which allows for a more efficient heating of the sample, and which saves energy as well.

A further technical advantage of the planar coil and heating device according to the invention is that they can heat fluids a) much faster and b) up to much higher temperatures than a conventional heating coil in a conventional heating bath.

A further technical advantage of the planar coil and the heating device of the invention is that it is much easier to keep a temperature at a constant level over time, as compared to standard heating coils and heating devices of the art.

A further technical advantage of the planar coil and heating device of the invention is that the potential breaking of the planar coil due to expansion of the material is prevented as compared to heating coils of the state of the art that are e.g. circled around a heated core or rod, which usually has a different expansion coefficient as compared to the planar coil. This is particularly true, when the planar coil is a glass coil, preferably a borosilicate glass coil. The planar coil of the invention can expand easily without the spatial constraints of a heating core or rod.

Starting from the described state of the art, it has been the problem of the invention to provide a heating device for heating samples that avoids the disadvantages that are associated with heating devices known in the art.

The invention has solved said problem by providing a planar coil, a heating device comprising one or more of said planar coils as well as a method for heating a sample using the heating device of the invention, as described herein and as claimed in the enclosed set of claims.

In particular, the invention has solved said problem by providing a planar coil (1) of a tube (2), wherein the planar coil (1) has an overall planar shape. The cross-section of the tube (2) can be oval. The cross-section of the tube (2) can also be round. The overall shape of the coil can be planar, even and flat, when referring to the side-view. This specific spatial geometry of the planar coil (1) is a hallmark feature of the invention. In one preferred embodiment of the invention, the planar coil (1) is a glass coil, preferably a borosilicate glass coil. In other embodiments of the invention, the planar coil (1) can also be a synthetic coil, a plastic coil or a metal coil.

In the following, a few terms related to the invention are defined.

DEFINITIONS

The term "planar coil", as used herein, refers to a coil formed by a tube. Such "coil" has a planar shape, when referred to from the side-view. The term "planar" is also to be understood as "even" and "flat". The terms "planar", "flat" and "even" are to be understood as referring to the relatively minor height of the coil, when referring to the side-view. The height of the coil can be defined by the inner and outer diameter of the tube. One example of the side-view can be seen in FIG. 2, top left.

The term "turn", as used herein, refers to the horizontal forming of the tube in one circle, which means about a full circle of up to 360°. The planar coil of the invention can have varying numbers of such turns, as described herein. One embodiment is shown in FIG. 2, which depicts a 12-turn coil.

The term "tube", as used herein, refers to a tube that comprises an inner channel that can guide or lead a sample, such as a fluid or a solution to be heated. The "inner channel" of the "glass tube" can also be referred to as "lumen". The "tube" comprises an inner diameter that is defined by the inner walls of the tube. In addition, the tube comprises an outer diameter that is defined by the outer boundary of the tube. A "tube", as used herein, can preferably be made of glass, preferably of borosilicate glass. In other embodiments of the invention the tube is made of a synthetic, of plastic, or of a metal.

The term "total volume", as used herein, refers to the volume of sample, e.g. a fluid or a solution, comprised in the entire lumen of the planar coil of the invention.

The term "oval", as used herein, refers to the cross-section of the planar tube that forms the planar coil. Synonyms for "oval", as used herein, are "elliptic" or "shape of an ellipse". Such oval cross-section of the tube does have a longitudinal, horizontal, more extended side of the oval tube that contacts the underlying surface, such as the surface of a heating foil or the surface of a supporting plate.

FIGURES

FIG. 1 shows one embodiment of the coil of the invention comprising the planar coil (1) of a tube (2). a) and b): The depicted coil is a glass coil with 12-turns. c) The top left drawing shows the overall planar shape, as seen from the side-view. The inlet and or outlet of the planar coil can protrude above or below (in this case above) the planar level of the coil. d) The top right view shows a cross-section through the glass coil, wherein the oval shape is visible. The more extended, longitudinal surface of the oval cross-section of the glass coil/glass tube is in contact with the underlying surface. Values given are in mm.

DESCRIPTION

Figure 1:
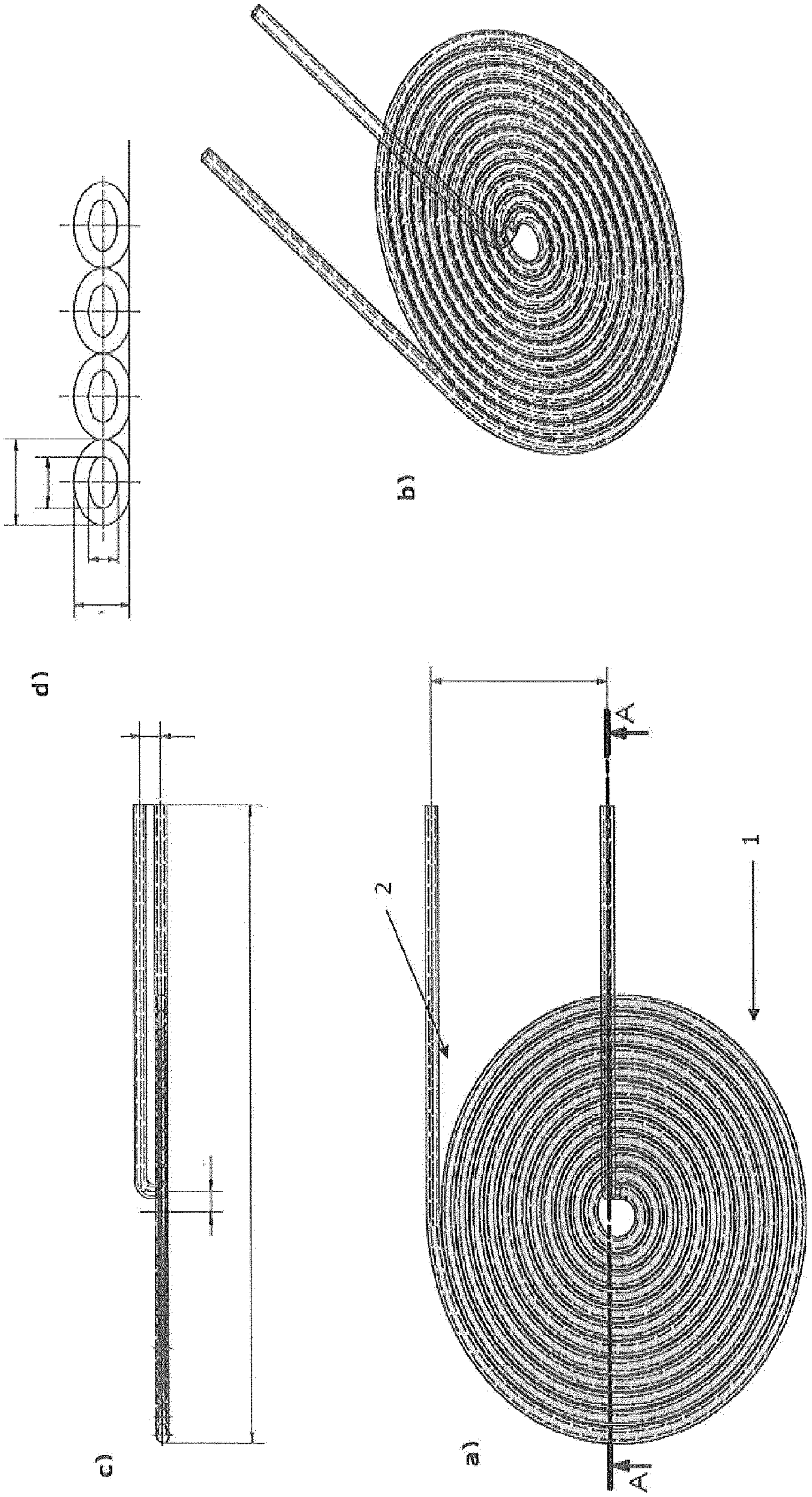
Figure 2:
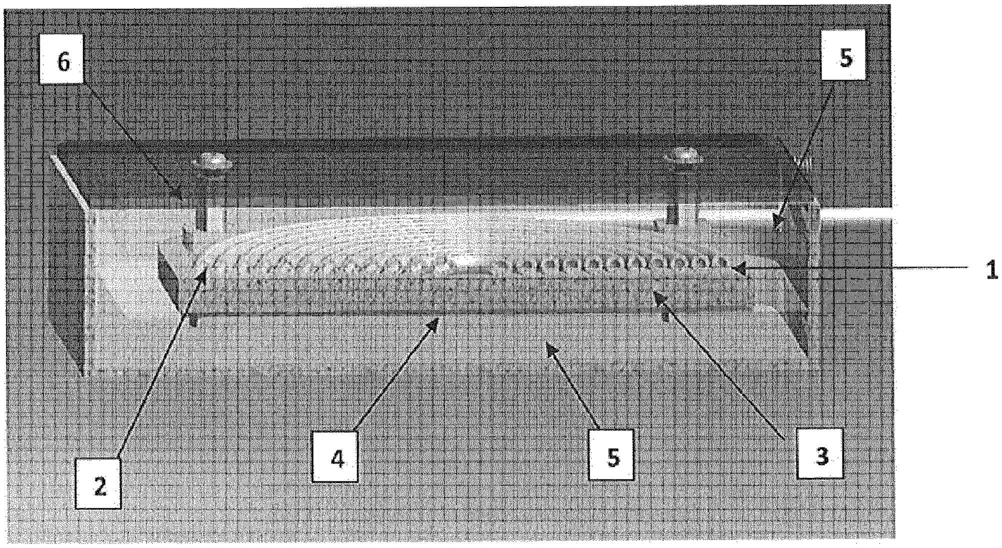
FIG. 2 shows a cross-section view of one embodiment of the heating device of the invention comprising a planar glass coil (1), a supporting plate (3), a heating foil (4), an isolation (5) and a pressure plate (6).

In the following, the invention is described in more detail.

The invention provides a planar coil (1) of a tube (2), wherein the planar coil (1) has an overall planar shape. The cross-section of the tube (2) can be oval. The cross-section of the tube (2) can also be round. The cross-section of the tube (2) can be elliptic or can have the shape of an ellipse.

The overall shape of the coil is planar when referring to the side-view.

The planar coil (1) according to the invention can comprise from 5 to 30 turns, preferably from 10 to 20 turns, and most preferably can comprise 10, 11, 12, 13, 14 or 15 turns. In one preferred embodiment, the planar coil comprises 12 turns.

The tube (2) comprises an inner channel that can guide or lead a sample, such as a fluid or a solution to be heated. The tube (2) comprises an inner diameter that is defined by the inner walls of the tube (2). In addition, the tube (2) comprises an outer diameter that is defined by the outer boundary of the tube (2).

The planar coil (1) of the tube (2) of the invention can guide or lead a sample, such as a fluid or a solution to be heated, in its inner channel or lumen, wherein the sample flows through said inner channel or said lumen. The sample that flows through the planar coil (1) comprising the tube (2) can continuously flow through said inner channel or said lumen.

The planar coil (1) of the tube (2) can comprise an inlet and an outlet. The inlet can feed the sample into the coil and the outlet can lead the sample out of the coil. The portions of tube (2) that comprise said inlet and/or said outlet can protrude above or below the planar level of the main body of the coil (1), when referred to from the side-view. This can be seen in FIG. 1*c*).

The planar coil (1) according to the invention can comprise a total volume of from 1 to 50 ml, preferably of from 2 to 20 ml, more preferably of from 4 to 6 ml, and most preferably of 5.3 ml.

In further embodiments of the invention, the tube (2) of the planar coil (1) can have an inner diameter of from 1 mm to 4 mm, preferably of from 1.5 mm to 3 mm, and most preferably of 2 mm.

In further embodiments of the invention, the tube (2) of the planar coil (1) can have an outer diameter of from 2 mm to 6 mm, preferably of from 3 mm to 5 mm, and most preferably of 3.6 mm.

In a further embodiment of the invention, the longitudinal, more extended side of the tube (2) that can be oval can contact a surface. In a further embodiment, the tube (2) that can be oval with regard to its cross-section can contact a surface via a thermal conduction paste, preferably via the longitudinal, more extended, longitudinal side. This can be seen in FIG. 1*d*).

A thermal conduction paste, as contemplated by the invention, can be any commercially available thermal conduction paste. In one specific embodiment of the invention, the thermal conduction paste can be the Type 120 Thermal Compound of Wakefield Engineering, U.S. However, the invention is not limited to this particular type of thermal conduction paste.

In a further embodiment of the invention, the planar coil (1) can be a glass coil. In a further embodiment of the invention, said glass coil (1) can be a borosilicate glass coil. That means that the glass coil (1) and the glass tube (2) can be made of borosilicate glass. In other embodiments of the invention, the planar coil (1) and the tube (2) can be made of a synthetic, of plastic or of a metal. The cross-section of the tube (2) can be round, oval, elliptic or can have the shape of an ellipse.

The invention further provides the use of one or more of the planar coil (1), as described herein, and as claimed in the enclosed set of claims. In particular, the invention further provides the use of one or more of the planar coil (1) for heating a sample in a heating device. Said heating device can be a component of an analytical device. Said analytical device comprising the heating device can be a continuous flow analyzer, preferably a segmented continuous flow analyzer. In more specific embodiments, said analytical device can be the the AutoAnalyzer 3 HR™ segmented flow analyzer of the applicant, or the AutoAnalyzer 1™ segmented flow analyzer of the applicant or the QuAAtro™ microflow analyzer of the applicant, or equivalents thereof. In a further embodiment of the invention, the use according to the invention of the one or more planar coil (1) can be the use of one or more glass coils (1). In a further embodiment of the invention, said one or more glass coils (1) can be one or more borosilicate glass coils. That means that the one or more glass coils (1) and the one or more glass tubes (2) can be made of borosilicate glass. In other embodiments of the use of the invention, the one or more planar coils (1) and the one or more tubes (2) can be made of a synthetic, of plastic or of a metal. The cross-section of the tube (2) can be round, oval, elliptic or can have the shape of an ellipse.

The invention further provides a heating device comprising one or more of the planar coil (1), as described herein. In particular, the invention provides a heating device comprising one or more of a planar coil (1) of one or more of a glass tube (2), wherein the one or more planar coils (1) have an overall planar shape, and wherein the cross-section of the one or more tubes (2) can be oval. The cross-section of the tube (2) can be round, oval, elliptic or can have the shape of an ellipse.

In a further embodiment of the invention, the heating device can comprise:

a) at least one supporting plate (3), b) at least one heating foil (4), and c) at least one isolation (5).

The at least one supporting plate (3) can provide a solid support for the planar coil (1).

In a further embodiment of the invention, the heating device can comprise:

a) one supporting plate (3), b) one heating foil (4), and c) one isolation (5).

The one supporting plate (3) can provide a solid support for the planar coil (1).

Figure 3:
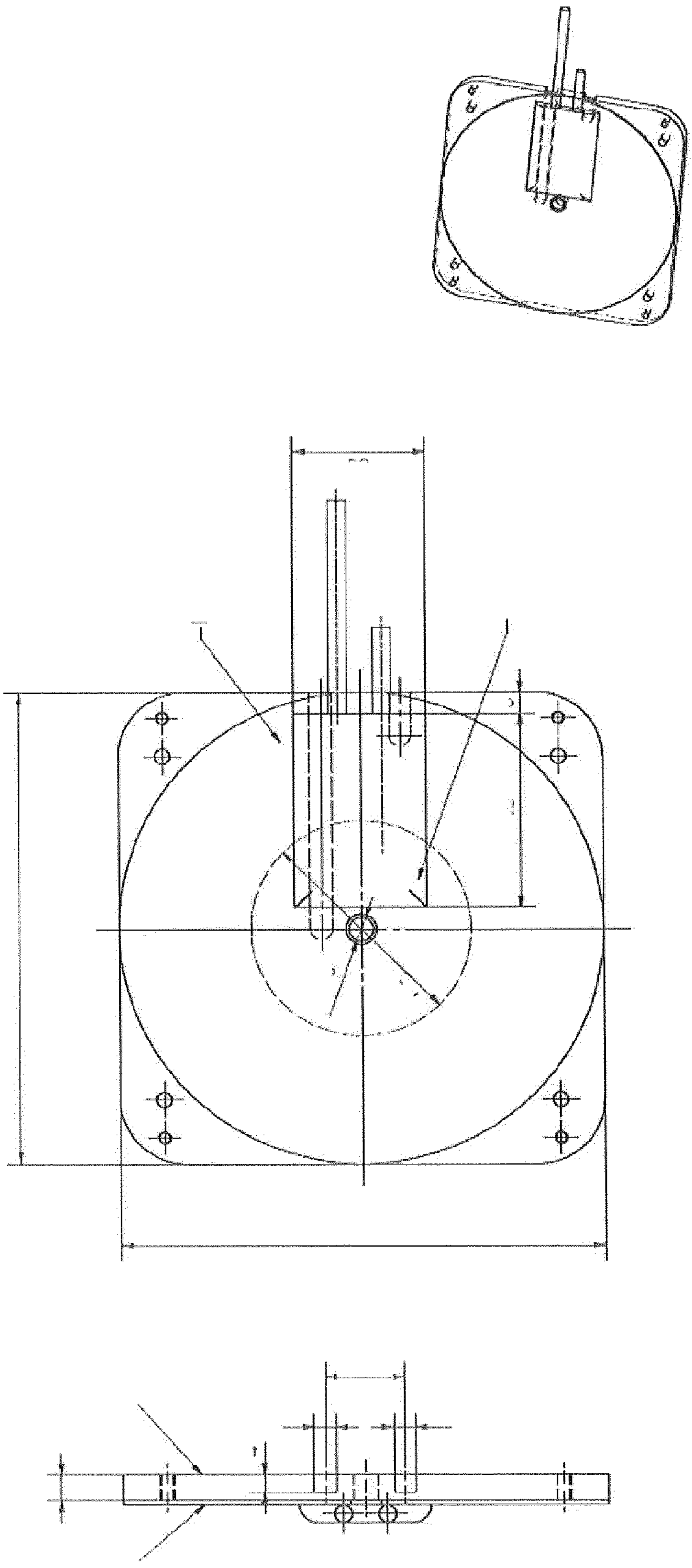
FIG. 3 shows one embodiment of the heating foil (4) as comprised in the heating device of the invention.
Figure 4:
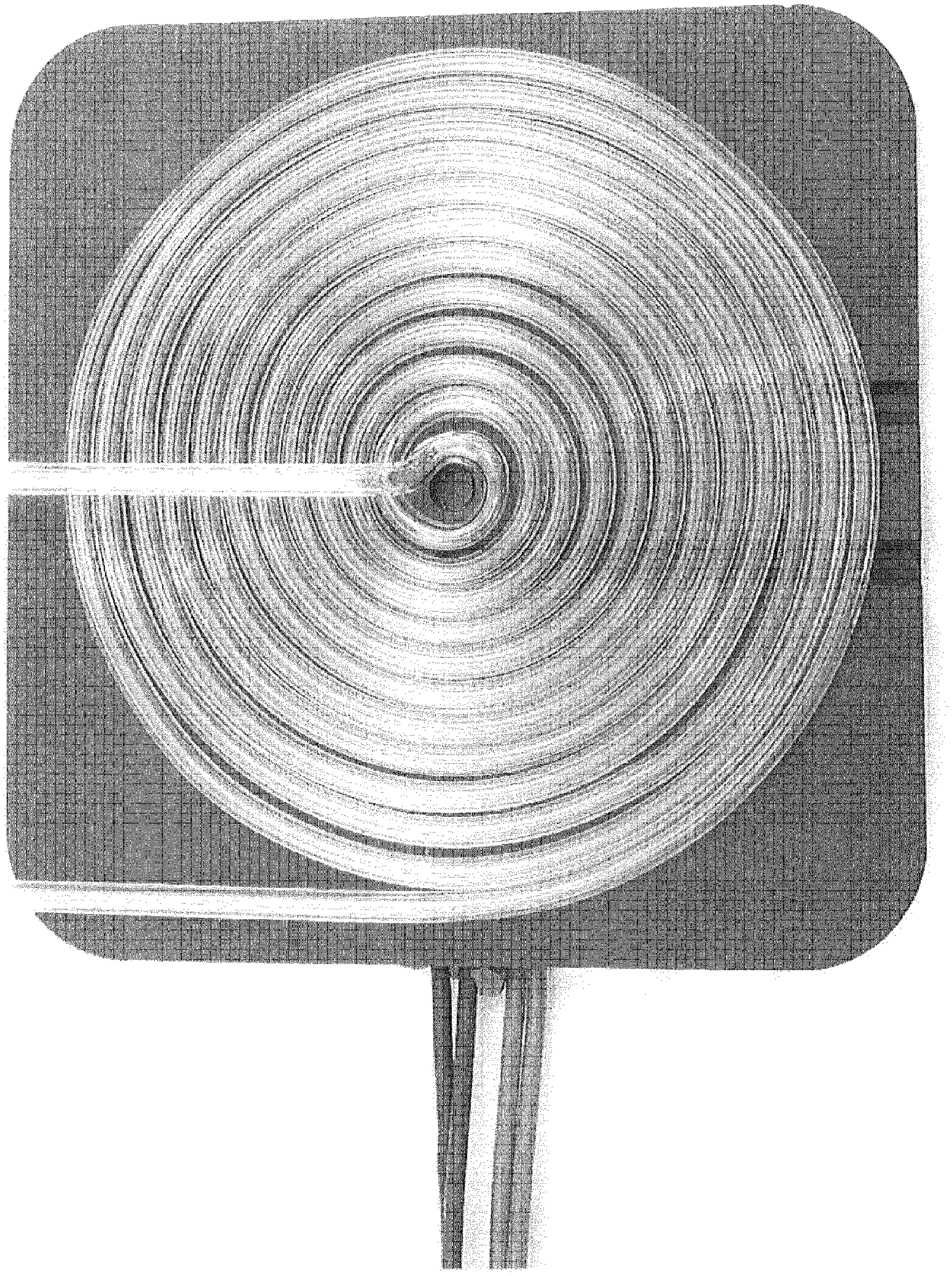
FIG. 4 shows one embodiment of the planar coil (1) of the invention, wherein the planar coil (1) is a glass coil that has been placed on a heating foil (4).
Figure 5:
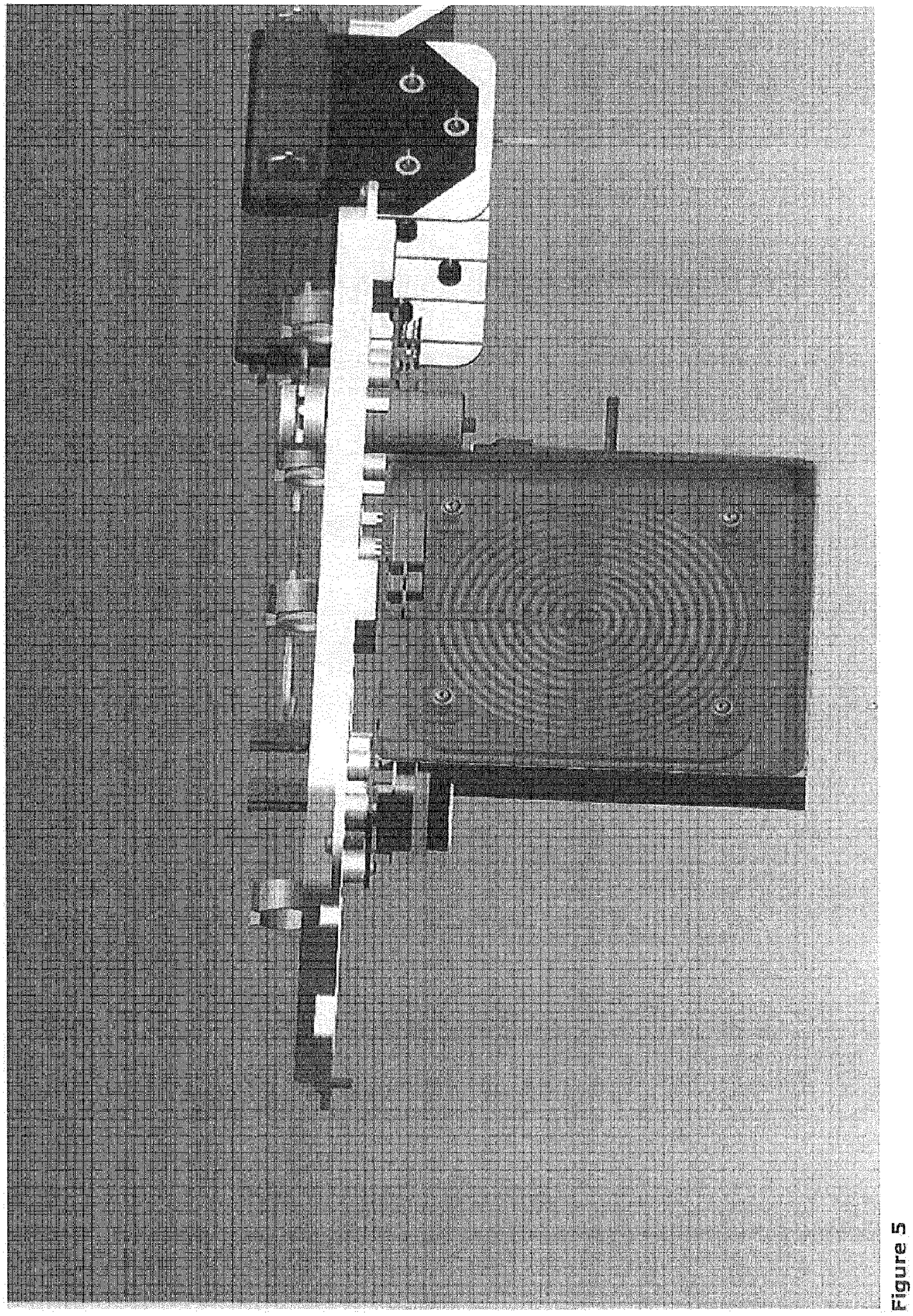
FIG. 5 shows one embodiment of the planar coil (1) of the invention, wherein the coil is part of the heating device of the invention being fit into a larger analytical device.
Figure 6:
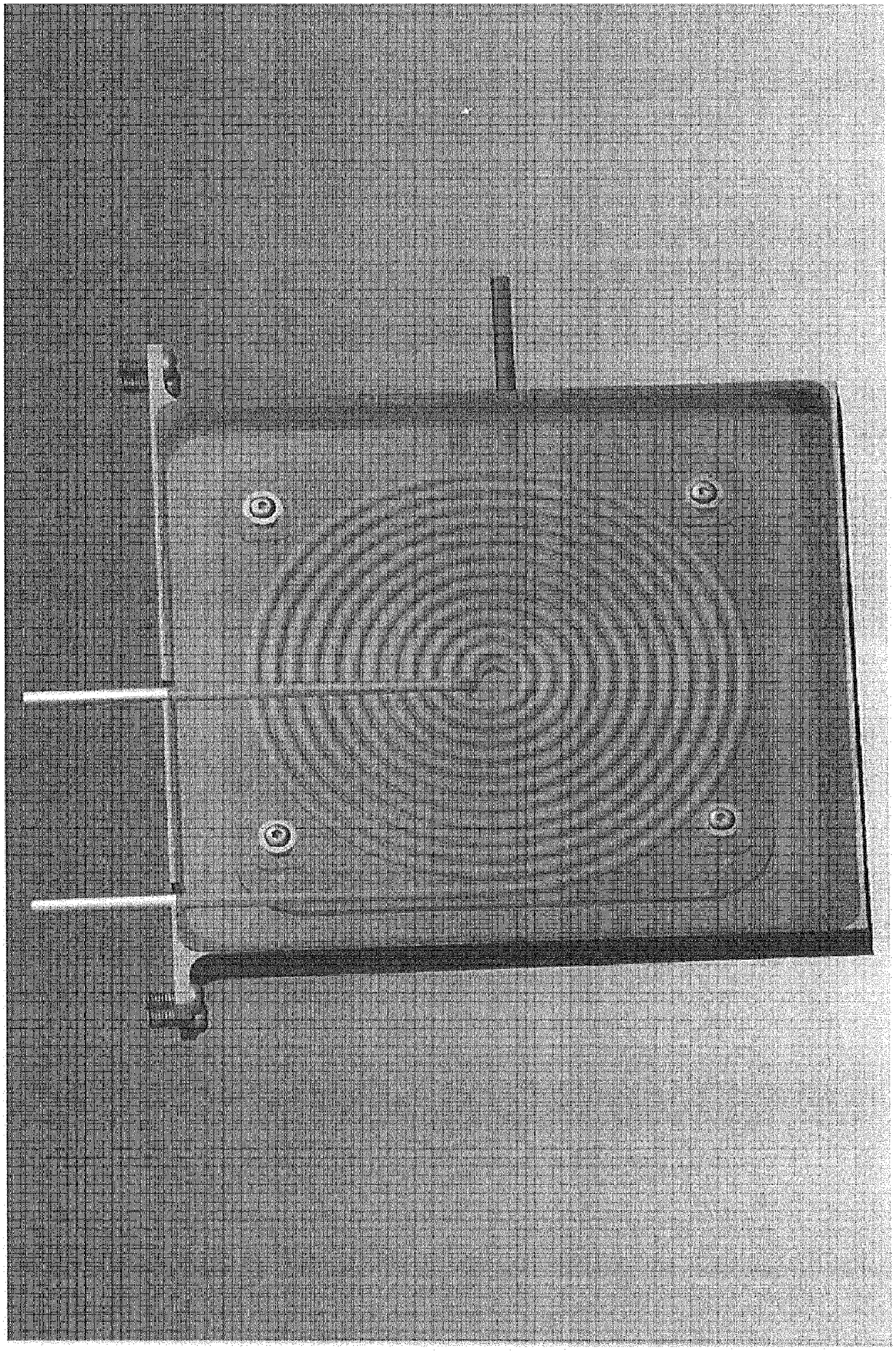
FIG. 6 shows one embodiment of the heating device of the invention, wherein the heating device comprises a glass coil (1).
Figure 7:
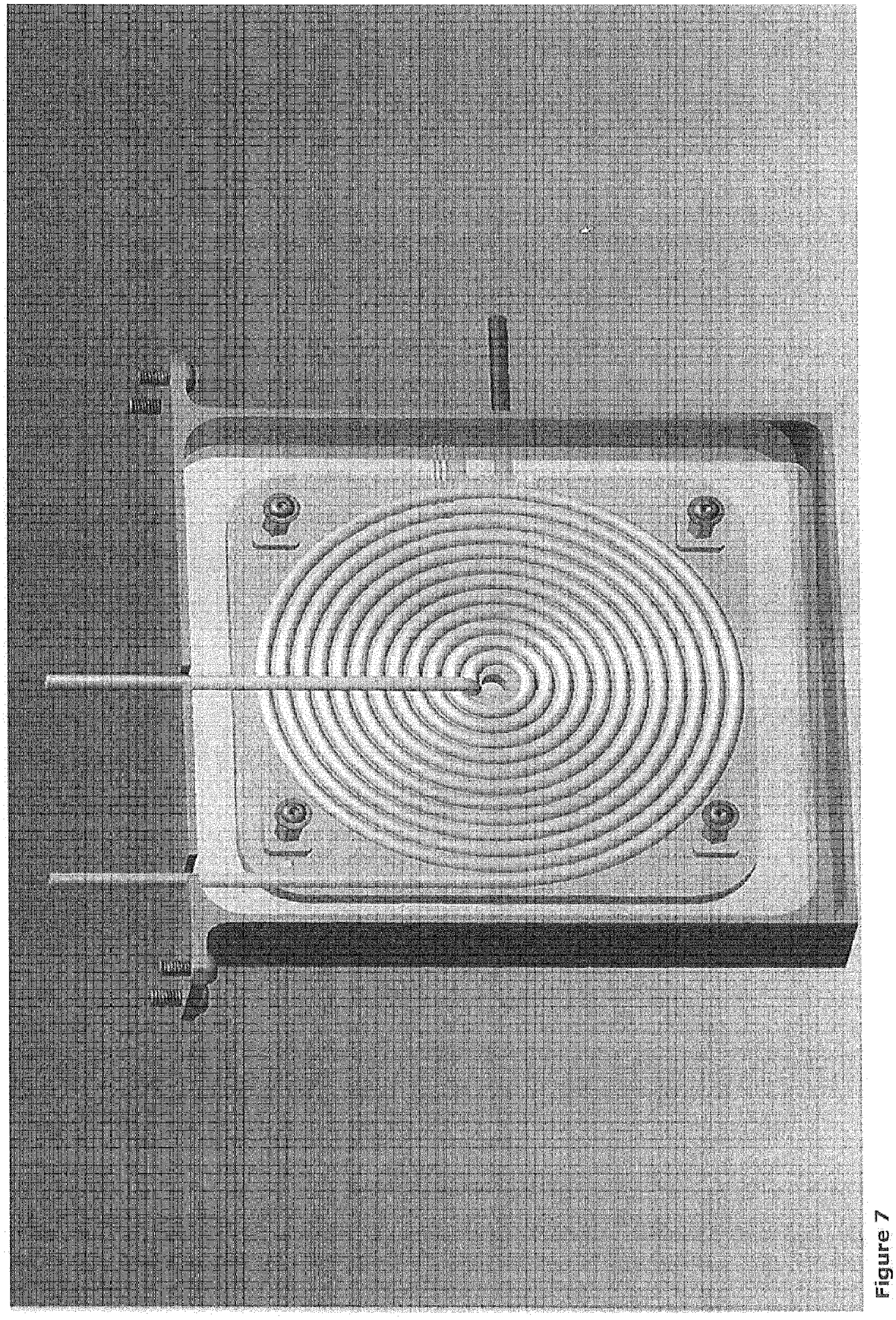
FIG. 7 shows a further embodiment of the heating device of the invention, wherein the heating device comprises a glass coil (1).
Figure 8:
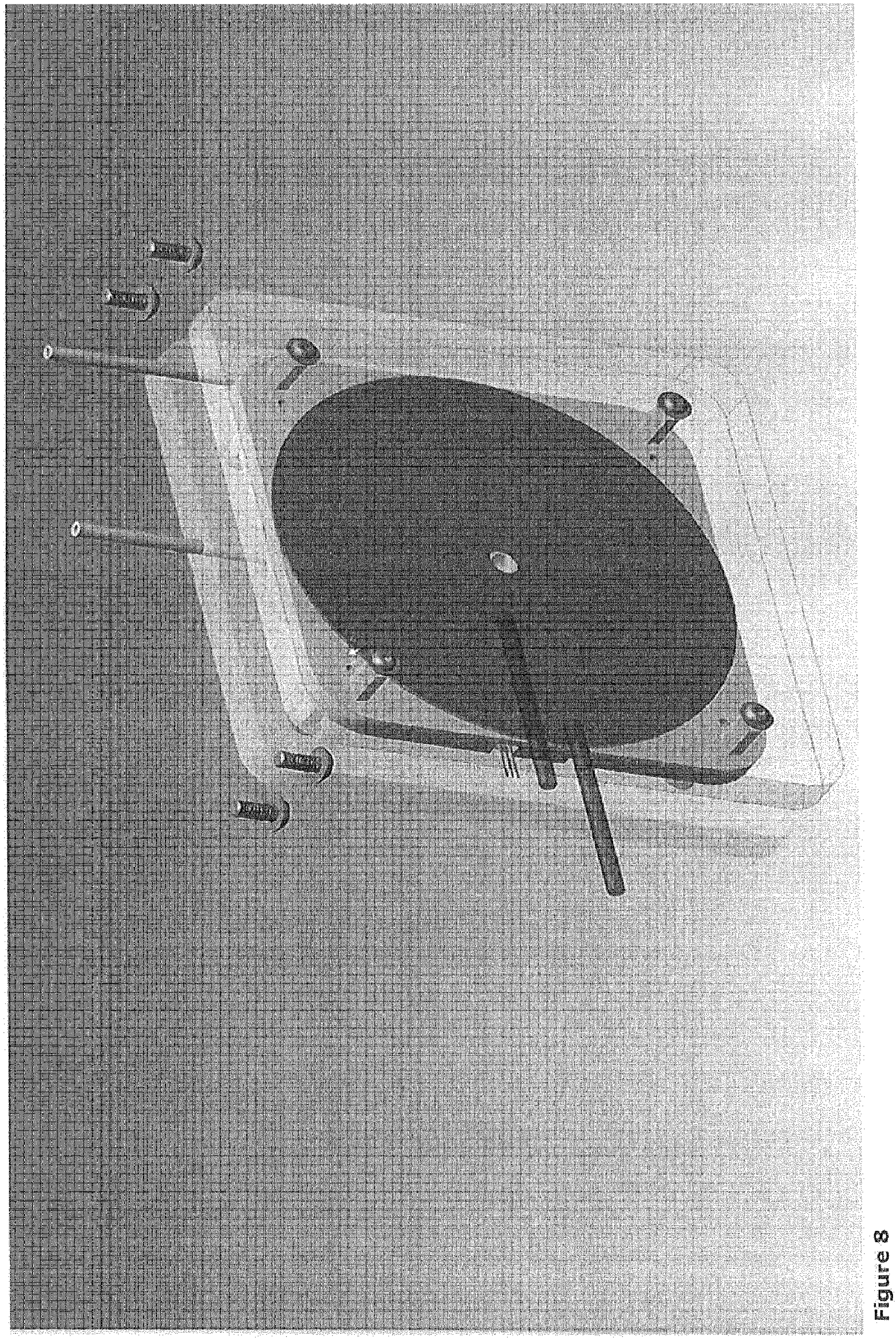
FIG. 8 shows a further embodiment of the heating device of the invention, wherein the heating device comprises a glass coil (1) and the heating foil (4) that can be seen in the front.

The heating foil (4) can heat the planar coil (1), either directly by direct contact with the planar coil (1), or via the supporting plate (2). The heating foil (4) can be made of silicon and can be heated by electric wires. One example of such a heating foil (4) is shown in FIG. 3. The heating foil (4) can be vulcanized on the supporting plate (3) which can be made of aluminium. The planar coil (1) can be pressed directly onto the heating foil (4). Alternatively, the planar coil (1) contacts the supporting plate (3) and thereby indirectly the heating foil (4). The oval shape of the cross-section of the planar coil (1) can enhance the contact surface of the planar coil (1) with the heating foil (4) and/or with the supporting plate (3). This provides the technical effect of a more efficient transfer of thermal energy from the heating foil (4) to the planar coil (1), since the longitudinal more extended side of the oval shape of the tube offers a larger surface as compared to a tube having a standard round shape. This contact can be enhanced even further by applying a thermal conduction paste at the contact of planar coil (1) and supporting plate (3) and/or the heating foil (4), thereby enhancing the thermal conductivity even further so that an optimal thermal coupling is achieved.

As described above, contact of the planar coil (1) to the supporting plate (3), or directly to the heating foil (4) can be enhanced by a thermal conduction paste. Any commercially available thermal conduction paste can be used in the heating device of the invention. In more a specific embodiment, the thermal conduction paste can be the Type 120 Thermal Compound of Wakefield Engineering, U.S.

In a further embodiment of the heating device of the invention, the isolation plate (5) can be placed below the heating foil (4) and/or the supporting plate (3). The isolation plate (5) can function to isolate the remainder of the heating device and/or the analytical device from the heat generated by the heating foil (4). The isolation plate (5) can also function to isolate and keep the heating energy generated by the heating foil (4) in the heating device of the invention.

In a further embodiment of the invention, the heating device can further comprise:

d) at least one pressure plate (6).

The pressure plate (6) can function to tighten and fix the individual components of the heating device of the invention.

In a further embodiment of the invention, the heating device can further comprise:

d) one pressure plate (6).

In a further embodiment of the invention, the heating device can be a component of an analytical device, preferably a continuous flow analyzer, more preferably a segmented continuous flow analyzer. That means that the heating device of the invention can be built into an analytical device, e.g. into the analytical devices mentioned above. In more specific embodiments, the analytical device comprising the heating device of the invention can be the AutoAnalyzer 3 HR™ segmented flow analyzer of the applicant, or the AutoAnalyzer 1™ segmented flow analyzer of the applicant, or the QuAAtro™ microflow analyzer of the applicant, or equivalents thereof.

The heating device of the invention can be built into an analytical device in operational connection, wherein the sample to be analyzed is heated by the heating device and passed on to further components of said analytical device.

In one embodiment of the heating device according to the invention, the sample can be heated up to 80° C., preferably up to 100° C., more preferably up to 120° C., even more preferably up to 140° C., and most preferably up to 160° C. However, the sample can also be heated up to temperatures higher than 160° C., such as up to 165° C., up to 170° C., up to 175° C., up to 180° C., up to 185° C., up to 190° C., up to 195° C. and up to 200° C. Every individual value of temperature in ° C. from 50° C. to 200° C. is also contemplated for the heating device of the invention.

The heating device of the invention can allow for a deviation of the target temperature of less than ±0.2° C.

In a further embodiment of the heating device of the invention, the heating device comprises two planar coils (1), preferably two glass coils (1), on each side of a supporting plate (3) and/or a heating foil (4). This has the technical advantage of doubling the available total volume of the planar coil (1). In further embodiments of the invention, the heating device can comprise two, three or four or more planar coils that preferably can be glass coils (1), more preferably borosilicate coils. In specific embodiments of the invention, the heating device of the invention can comprise multiple planar coils (1), preferably multiple glass coils (1), even more preferably multiple borosilicate glass coils (1). The cross-section of the tube (2) can be round, oval, elliptic or can have the shape of an ellipse.

The invention further provides a method for heating a sample comprising the step of heating the sample in the heating device, as described herein and as claimed in the enclosed set of claims.

In particular, the invention further provides a method for heating a sample comprising the step of heating the sample in the heating device comprising one or more of the planar coil (1) of the invention.

In particular, the invention provides a method for heating a sample comprising the step of heating a sample in the heating device comprising one or more of the planar coil (1) of the one or more tubes (2), wherein the one or more planar coil (1) can have an overall planar shape. The cross-section of the one or more tubes (2) can be oval, round, elliptic or can have an elliptic shape.

When performing the method according to the invention, the one or more planar coil (1) of the one or more glass tubes (2) can guide or lead a sample, such as a fluid or a solution to be heated, in its inner channel or lumen, wherein the sample flows through said inner channel or said lumen. The sample that flows through the planar coil (1) comprising the glass tube (2) can continuously flow through said inner channel or said lumen. When flowing through the inner channel of the glass tube, the sample can be heated, such that it changes from a fluid state to a gaseous state.

In one embodiment of the method according to the invention, the sample can be heated up to 80° C., preferably up to 100° C., more preferably up to 120° C., even more preferably up to 140° C., and most preferably up to 160° C. However, the sample can also be heated up to temperatures higher than 160° C., such as up to 165° C., up to 170° C., up to 175° C., up to 180° C., up to 185° C., up to 190° C., up to 195° C. and up to 200° C. Every individual value of temperature in ° C. from 50° C. to 200° C. is also contemplated for the method of the invention.

The heating device of the invention, as used in the method, can allow for a deviation of the target temperature of less than ±0.2° C.

In a further embodiment of the method according to the invention, the heating of the sample can be for analysis with an analytical device.

In a further embodiment of the method according to the invention, the method is performed within an analytical device. Such analytical device can be any analytical device that requires the heating of a sample. In more specific embodiments of the invention, such analytical device can be a continuous flow analyzer, more preferably a segmented continuous flow analyzer. In more specific embodiments of the invention, the analytical device can be the AutoAnalyzer 3 HR™ segmented flow analyzer of the applicant, or the AutoAnalyzer 1™ segmented flow analyzer of the applicant, or the QuAAtro™ microflow analyzer of the applicant, or equivalents thereof. The heating device of the invention can be built into an analytical device in operational connection, wherein the sample to be analyzed is heated by the heating device and passed on to further components of said analytical device.

In one embodiment of the method of the invention, the sample to be heated can be a fluid or a solution. The sample can be any type of sample that is of analytical interest. In more specific embodiments of the method of the invention, the sample can be an aqueous fluid or an aqueous solution. Any aqueous fluid or aqueous solution of analytical interest can be heated by the method according to the invention.

In further embodiments of the method according to the invention, the sample can be selected from the group consisting of water, drinking water, waste water, seawater, soil and plants, fertilizer, animal feed, tobacco and wine.

The invention is exemplified in the following example.

Example 1

A heating device was assembled comprising a glass coil made of borosilicate glass on a supporting plate (3) made of aluminium. The planar coil (1), heating foil (4) and heating device used in Example 1 are shown in FIGS. 3 to 8. A silicon heating foil (4) was vulcanized on the back of a supporting plate (3). The aluminium supporting plate (3) had a size of 110×110 mm. The glass coil (1) was made of a glass tube (2) having an inner diameter of 2 mm and an outer diameter of 3.6 mm. The volume of the glass coil (1) was 5.3 ml and had 12 turns, i.e. a 12-turn coil. The heating foil (4) for heating the aluminium supporting plate (3) was run with a power of 90 watts and 24 volts. The tube (2) did have an oval cross-section. In other experiments the tube (2) did have a round cross-section.

The measurements of the temperature for this set up were made with a digital temperature sensor directly in the aluminium supporting plate (3). The system was controlled by a pulse width modulation. Test runs were made at a temperature of 95° C. for testing the stability of the heating device with regard to high temperatures. The deviation in operation was below 0.1° C. In addition, the absolute accuracy of the sensors with regard to the temperature was tested for this set up with a calibrated measuring device with +/−0.5° C.

In a second embodiment of a heating device according to the invention, up to 1.2 ml of water per minute were evaporated, in order to test the effectivity of the thermal transfer. In this second embodiment of the heating device, thermal coupling was additionally enhanced with a thermal conduction paste.

The example shows that a coil and a heating device according to the invention are particularly useful in heating samples for analytical purposes.

The invention claimed is:

1. A planar coil (1) of a tube (2) for heating a fluid sample flowing through an inner channel of the tube (2), wherein the planar coil (1) has an overall planar shape and is a planar glass coil, and wherein said tube (2) comprises an inlet to feed a sample into the planar coil (1) of tube (2), and an outlet to lead the sample out of the planar coil (1) of tube (2), wherein a longitudinal side of said planar glass coil is in direct contact with a heating foil or wherein said longitudinal side of said planar glass coil is in direct contact with a heating plate.

2. The planar glass coil of claim 1, wherein the cross-section of the tube (2) is oval or round.

3. The planar glass coil of claim 1, wherein the coil (1) comprises from 5 to 30 turns.

4. The planar glass coil of claim 2, wherein the coil (1) comprises 12 turns.

5. The planar glass coil of claim 1, wherein the coil (1) comprises a total volume of from 1 to 50 ml.

6. The planar glass coil of claim 1, wherein the coil (1) comprises a total volume of from 2 to 20 ml.

7. The planar glass coil of claim 1, wherein the coil (1) comprises a total volume of from 4 to 6 ml.

8. The planar glass coil of claim 1, wherein the coil (1) comprises a total volume of 5.3 ml.

9. The planar glass coil of claim 1, wherein the tube (2) has an inner diameter of from 1 mm to 4 mm and has an outer diameter of from 2 mm to 6 mm.

10. The planar glass coil of claim 1, wherein the tube (2) has an inner diameter of from 1.5 mm to 3 mm, and has an outer diameter of from 3 mm to 5 mm.

11. The planar glass coil of claim 1, wherein the tube (2) has an inner diameter of 2 mm, and has an outer diameter of 3.6 mm.

12. The planar glass coil of claim 1, wherein the said longitudinal side of-said planar glass coil contacts said heating foil or said heating plate via a thermal conduction paste.

13. The planar glass coil of claim 1, wherein the planar glass coil (1) is a borosilicate glass coil.

14. A heating device comprising one or more of the planar glass coil (1) of claim 1.

15. The heating device of claim 14, further comprising:

at least one supporting plate (3) providing solid support for the planar glass coil (1), at least one heating foil (4) for heating the planar coil (1) by direct contact with the planar coil and/or via contact with said supporting plate (3), and at least one isolation (5) positioned below the heating foil (4) and/or the supporting plate 3.

16. The heating device of claim 14, further comprising:

at least one pressure plate (6) configured to tighten and fix individual components of said heating device.

17. An analytical device comprising a heating device of claim 14.

18. The analytical device of claim 17, wherein the analytical device is a continuous flow analyser.

19. The analytical device of claim 17, wherein the analytical device is a segmented continuous flow analyzer.

20. A method for heating a sample comprising the step of heating the sample in the heating device of claim 14.

21. The method of claim 20, wherein the heating of the sample is for analysis with an analytical device.

22. The method of claim 20, wherein the sample is heated up to 80° C.

23. The method of claim 20, wherein the sample is heated up to 100° C.

24. The method of claim 20, wherein the sample is heated up to 120° C.

25. The method of claim 20, wherein the sample is heated up to 140° C.

26. The method of claim 20, wherein the sample is heated up to 160° C.

27. The method of claim 20, wherein the method is performed within an analytical device.

28. The method of claim 27, wherein the analytical device is a continuous flow analyser.

29. The method of claim 27, wherein the analytical device is a segmented continuous flow analyzer.

* * * * *